United States Patent [19]

Rabideau

[11] Patent Number: 5,031,350

[45] Date of Patent: Jul. 16, 1991

[54] WEEDGUARD-SKIRT APPARATUS AND METHOD

[76] Inventor: Phillip A. Rabideau, 3605 Fawn Creek, Austin, Tex. 78746

[21] Appl. No.: 431,463

[22] Filed: Nov. 2, 1989

[51] Int. Cl.$^5$ ............................................. A01K 83/00
[52] U.S. Cl. ....................................... 43/43.4; 43/42.1
[58] Field of Search .................... 43/42.1, 42.4, 42.41, 43/43.2, 43.4, 42.24, 42.25, 42.26, 42.27, 42.28, 42.29

[56] References Cited

U.S. PATENT DOCUMENTS

| | | | |
|---|---|---|---|
| 2,473,564 | 7/1946 | Bergren | 43/43.2 |
| 3,060,620 | 10/1962 | Binkowski | 43/42.28 |
| 3,170,756 | 2/1965 | Butler | 43/43.4 |
| 3,959,912 | 6/1976 | Lee | 43/42.28 |
| 4,217,721 | 8/1980 | Hershberger | 43/43.2 |
| 4,744,167 | 5/1988 | Steele | 43/43.2 |
| 4,763,436 | 8/1988 | Lindmeyer | 43/42.4 |

*Primary Examiner*—Kurt Rowan
*Assistant Examiner*—James Miner
*Attorney, Agent, or Firm*—J. Nevin Shaffer, Jr.; Russell D. Culbertson

[57] ABSTRACT

A weedguard-skirt device for use with a fishing hook is adapted both for protecting the hook point from debris in the water and for providing a bait enhancing undulating motion as the hook is pulled through the water. The weedguard-skirt device preferably includes a base section adapted to be connected to the hook shank, and a plurality of elongated weedguard-skirt members connected to the base section and extending radially and rearwardly therefrom. Each weedguard-skirt member includes a front portion adapted to resist flexing toward the hook shank. A rear or skirt portion is connected to each weedguard-skirt front portion and adapted to extend rearwardly of the hook. The skirt portions are also adapted to undulate freely in a radial direction with respect to the hook shank axis. In the preferred form of the invention the base portion and weedguard-skirt members are integrally formed from a suitable soft plastic material. The flexing properties of the weedguard-skirt members in this preferred form of the invention are produced by varying the cross sectional shape of the members from the front portion to the rear or skirt portion.

9 Claims, 2 Drawing Sheets

WEEDGUARD-SKIRT APPARATUS AND METHOD

BACKGROUND OF THE INVENTION

There are a number of fishing techniques or methods that require the use of a fishing hook whose hook point is protected from snagging on debris in the water. Such protected hooks, commonly known as weedless hooks, are of particular advantage when fishing among weeds, n brush piles, or close to debris on the bottom of lakes and rivers. Weedless single hooks are commonly used with live bait such as worms or minnows, and weedless treble hooks are used with artificial lures such as plugs and spoons.

Some prior weedless hooks utilized a wire structure connected to the hook shank and extending outwardly to near the hook point in position to deflect weeds and other debris away from the hook point as the hook was pulled through water. The wire structure also required a certain flexibility so that it did not interfere with the hooking of a fish by the point and barb. Other weedless hook structures, particularly for single hook baits or lures such as jigs, utilized a stiff plastic member or a bundle of stiff plastic fibers positioned ahead of the hook point to deflect weeds away from the hook point as the lure was pulled through the water.

Fishing lures also commonly used a skirt arrangement as an enhancement to attract fish to strike the lure. These lure or hook skirts were commonly made from flat strands of flexible plastic or rubber. The strands were adapted to extend rearwardly behind the hook in position to flex and undulate as the hook was drawn through the water.

Although prior fishing hook skirts were positioned to extend adjacent to the hook point, the skirt strands were too flexible to deflect debris away from the hook point and did not render the hook weedless. Also, the wire or rigid plastic weedguard members were not adapted to hide the hook or undulate as the hook was drawn through the water to provide any fish attracting enhancement. In fact, prior weedguard devices tended to accentuate the hook, and thus made the bait less attractive.

SUMMARY OF THE INVENTION

Accordingly, it is a general object of the invention to provide a weedguard-skirt device for fishing hooks that not only protects the hook from snagging on debris, but also enhances the bait to attract fish by its skirt-like construction.

Pursuant to this general objective, a weedguard-skirt member embodying the principles of the invention includes both a front deflecting portion for deflecting debris away from the hook points, and a rear or skirt portion adapted to flex and undulate as the hook is drawn through the water. A number of these weedguard-skirt members may be positioned circumferentially around the hook shank to form a conical and preferably parabolic structure that surrounds and protects the hook points. The conical or preferably parabolic weedguard-skirt structure made up of a number of individual weedguard-skirt members also serves to protect bait which may be impaled on the hook from being torn off by debris as the hook is pulled through the water.

The front or deflecting portion of each weedguard-skirt member is adapted to resist flexing inwardly toward the hook shank to provide the desired debris deflecting action. In the preferred form of the invention, the front or deflecting portion of each weedguard-skirt member has a cross sectional shape with its major transverse axis lying in a plane extending generally radially with respect to the hook shank, and this cross sectional shape provides the desired resistance to flexing. However, the rear or skirt portion of each weedguard-skirt member is adapted to easily flex in the direction radial to the hook shank. In the preferred form of the invention, the rear or skirt portion of each weedguard-skirt member comprises a thin strip of material with its major transverse axis extending generally perpendicular to a line extending radially from the hook shank. Also, in the preferred form of the invention, each weedguard-skirt member varies generally continuously in cross sectional shape from the front or deflecting weedguard-skirt portion to the rear or skirt portion; and thus, each weedguard-skirt member includes a midsection that is generally square in cross sectional shape.

The weedguard-skirt members are preferably connected to a base portion that is adapted to be positioned directly on the hook shank near the hook eye. The individual weedguard-skirt members extend radially outwardly from the base portion and hook shank towards the rear of the hook to form the conical and preferred generally parabolic shape, with the individual weedguard-skirt members separated by narrow slits. In this preferred form of the invention, with the individual weedguard-skirt members separated by narrow slits, the members are positioned to compact together circumferentially as the hook is drawn through the water so as to limit flexing of the weedguard-skirt members not only inwardly toward the hook shank, but also laterally of the hook shank. It will readily be appreciated that the compacted conical or parabolic shape formed as the preferred form of the invention is drawn through the water, helps protect not only the hook points, but also any enhancement bait that may be impaled on the hook shank.

In the preferred form of the invention, the plurality of weedguard-skirt members are integrally formed with the base portion. The desired conical or parabolic shaped weedguard-skirt structure is preferably formed from a soft plastic material through a suitable molding process, and slits are cut, molded, or otherwise formed in the sides of the resulting cone or parabola to produce the individual weedguard-skirt members.

These and other objects, advantages, and features of the invention will be apparent from the following description of the preferred embodiments, considered along with the accompanying drawings.

DESCRIPTION OF THE PREFERRED EMBODIMENTS

Figure 1:
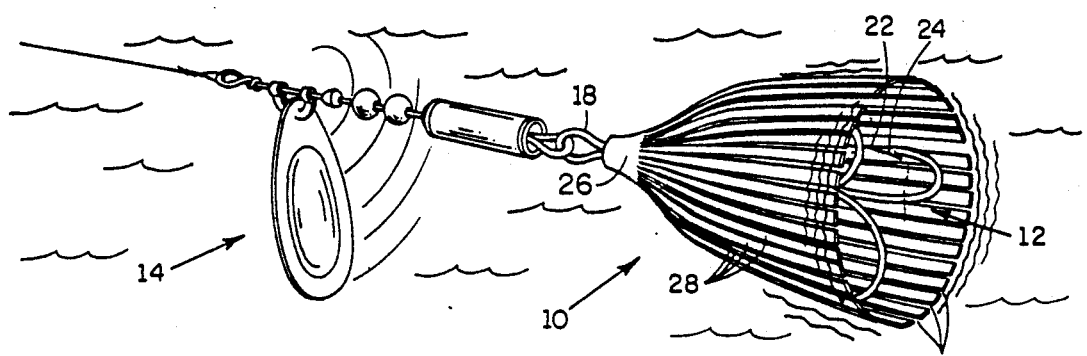
FIG. 1 is an isometric view of an in line weighted-body spinner with a trailing treble hook with a weedguard-skirt device embodying the principles of the invention positioned thereon.
Figure 2:
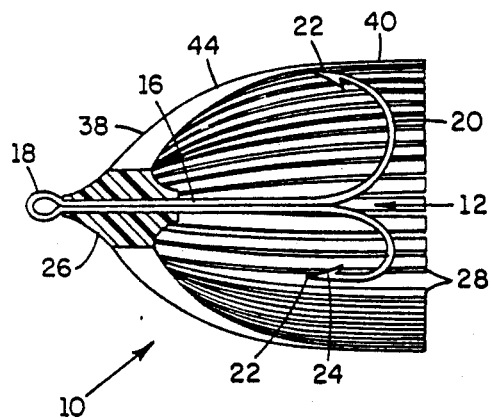
FIG. 2 is a view in longitudinal cross section of a weedguard-skirt device embodying the principles of the invention as used with a treble hook.
Figure 3:
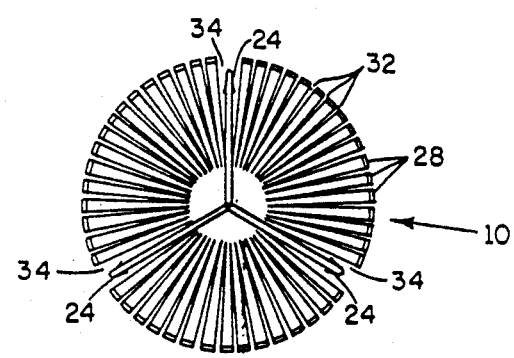
FIG. 3 is a rear view of the weedguard-skirt device and treble hook of FIG. 2.

FIGS. 1-3 illustrate one preferred form of weedguard-skirt device 10 embodying the principles of the invention as used with a treble hook 12 of a weighted-body spinner 14. The illustrated common treble hook 12 includes an elongated hook shank 16, a hook eye 18 at one end of the shank, and three hook bends 20 oriented at approximately 120° apart about the shank axis, each bend having a hook point 22 and barb 24. The preferred weedguard-skirt device 10 shown positioned on the treble hook 12 includes a base portion 26 adapted to be securely connected to the hook shank 16 near the hook eye 18 and a plurality of individual weedguard-skirt members 28 connected to the base and extending outwardly and rearwardly from the base to form a substantially parabolic shape.

The weedguard-skirt device 10 according to the invention performs several functions. First, the weedguard-skirt members 28 are adapted to protect the hook points 22 from snagging weeds or other debris in the water as the hook 12 is pulled through the water by the hook eye 18. Additionally, the generally parabolic weedguard-skirt device 10 shown in FIGS. 1 through 3 also enhances the lure. The weedguard-skirt members 28 of the weedguard-skirt device 10 are elongated past the hook points 22 and adapted to provide an undulating motion as the hook 12 is drawn through the water by the hook eye 18 to help attract fish to the lure.

Figure 4:
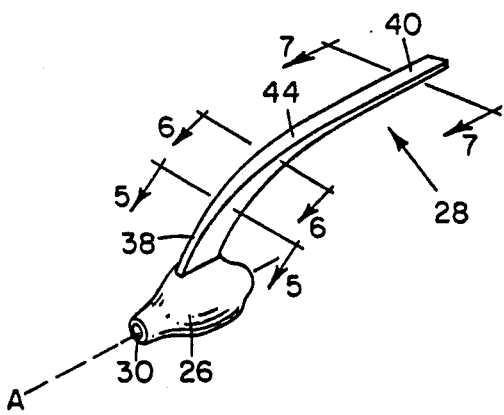
FIG. 4 is an isometric view of a single weedguard-skirt member embodying the principles of the invention.
Figure 5:
FIG. 5 is a view in transverse cross section taken along line 5—5 of FIG. 4.
Figure 6:
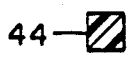
FIG. 6 is a view in transverse cross section taken along line 6—6 of FIG. 4.
Figure 7:
FIG. 7 is a view in transverse cross section taken along line 7—7 of FIG. 4.

The weedguard-skirt base section 26 serves to connect the individual weedguard-skirt members 28 in the desired orientation and to secure the weedguard-skirt members in the desired position on the hook 12. In the preferred form of the invention, the entire weedguard-skirt 10, including the base portion 26, is made of a soft plastic material such as PLASTISOL by a suitable molding process and the base portion has a hook connecting opening 30 extending therethrough as shown in FIG. 4. The opening 30 is slightly smaller than the hook shank 16 diameter so that when the base 26 is slipped onto the hook shank, the base material grips the shank to hold the weedguard-skirt device 10 securely in place, preferably just behind the hook eye 18.

In the preferred form of the invention, the base portion 26 is integrally formed with a skirt of the particular soft plastic used, molded into the desired conical or parabolic shape. The individual weedguard-skirt members 28 are formed with a series of slits 32 cut, molded, or otherwise formed radially through the sides of the parabolic, conical shape with respect to the longitudinal axis of the shape. As shown best in FIG. 3, the slits between adjacent weedguard-skirt members may be wider in the area of the hook points as shown at reference number 34.

The individual weedguard-skirt members 28 of the preferred weedguard-skirt device 10, as shown best in FIGS. 4-7, have unique properties adapted to provide the desired protection of the hook points 22 and also the desired enhancement. Referring to FIGS. 2 and 4, each weedguard-skirt member 28 includes a front or deflecting portion 38 and a rear or skirt portion 40. The front portion 38 of each weedguard-skirt member 28 extends from the base portion 26, generally radially outwardly from the hook shank 16 a distance approximately equal to the radial distance of the hook point 22 from the shank 16. This front portion 38 of each individual weedguard-skirt member 28 is adapted to resist flexing in the direction toward the hook shank 16 so as to deflect debris away from the hook point 22 as the hook 12 and weedguard-skirt member are drawn through the water by the hook eye 18. The rear or skirt portion 40 of each individual weedguard-skirt member 28 is connected to the respective front or deflecting portion 38 of the member and is positioned to extend rearwardly of the hook point 22 and generally parallel to the hook shank 16. Each weedguard-skirt member rear or skirt portion 40 is adapted to readily flex radially with respect to the hook shank longitudinal axis so as to undulate as the hook 12 and weedguard-skirt member 28 are drawn through the water.

Since, in the preferred form of the invention, the weedguard-skirt device 10 is integrally formed from a common soft plastic material, the transverse cross sectional shape of each weedguard-skirt member 28 varies between the front deflecting portion 38 and the rear skirt portion 40 to provide the desired flexibility properties. The front or deflecting portion 38 of the preferred form of the invention has a generally rectangular cross sectional shape with a major transverse axis lying in a plane extending radially from the hook shank 16, or the longitudinal axis "A" of the weedguard-skirt device. However, the rear or skirt portion 40 of each individual weedguard-skirt member 28 in the preferred form of the invention has a transverse cross sectional shape that is relatively thin in the direction extending radially from the hook shank or axis "A" and has a major transverse axis extending generally perpendicularly to the major transverse axis of the front or deflecting portion. This cross sectional shape for the rear or skirt portion allows the undulating motion as the weedguard-skirt member is drawn through the water while the cross sectional shape of the front or deflecting portion 38 provides the desired resistance to flexing or debris deflecting properties.

In the preferred illustrated form of the invention, the cross sectional shape of each individual weedguard-skirt member 28 varies substantially continuously from the front or deflecting portion 38 to the rear or skirt portion 40. Thus, each weedguard-skirt member 28 includes a midsection 44 between the front and rear portions, 38 and 40 respectively, with a generally square cross sectional shape. This midsection 44 is positioned generally at least a radial distance from the hook shank or axis "A" equal to the radial distance of the hook points 22 in FIGS. 1-3.

Figure 8:
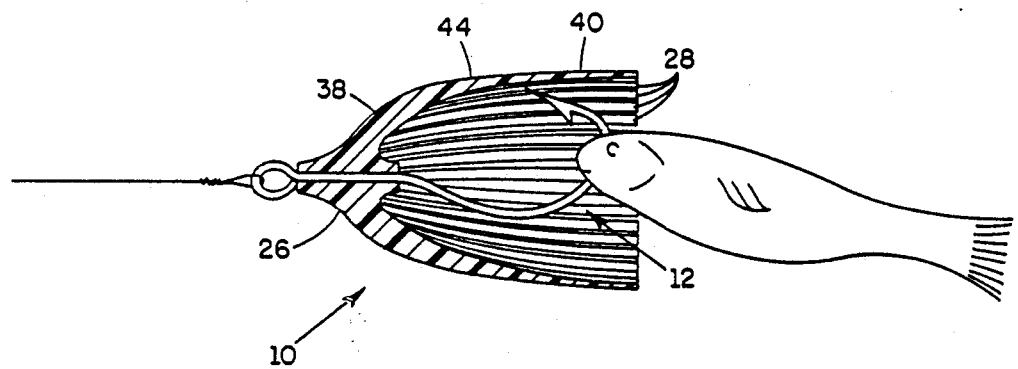
FIG. 8 is a view in longitudinal cross section of an alternate form of weedguard-skirt device according to the invention as applied to a single point hook.

In the preferred form of the invention illustrated in FIGS. 1-3, the closely spaced weedguard-skirt members 28 separated by radial slits 32 not only act separately to provide protection from debris in the water, but also cooperate to provide enhanced protection from snags. When the weedguard-skirt device 10 is pulled through the water as shown in FIG. 1, the individual weedguard-skirt members 28 compact circumferentially in the front or deflecting portion 38 so as to substantially limit any flexing to flexing in the direction toward the hook shank 16, the direction in which each front or deflecting portion is adapted to resist flexing. This compacting of adjacent weedguard-skirt members 28 in the illustrated preferred form of the invention helps retain the conial or parabolic shape through the front or deflecting portion 38 and midsection 44 of each weedguard-skirt member so that the weedguard-skirt device 10 encircles the hook points 22 and renders the hook 12 weedless. Furthermore, any impalements on the hook 12, such as live bait are also protected from entanglement in brush, weeds, and bottom debris, as illustrated in FIG. 8. Past the front or deflecting portion 38 and the midsection 44, the rear or skirt portion 40 of the weedguard-skirt members 28 lose their ability to compact circumferentially and undulate independently as the device 10 is pulled through the water on the hook 12. When a fish closes its mouth on the weedguard-skirt device 10, enough additional force is exerted by the fish's mouth to collapse the weedguard-skirt device and allow impalement on the hook points 22 and barbs 24.

Figure 9:
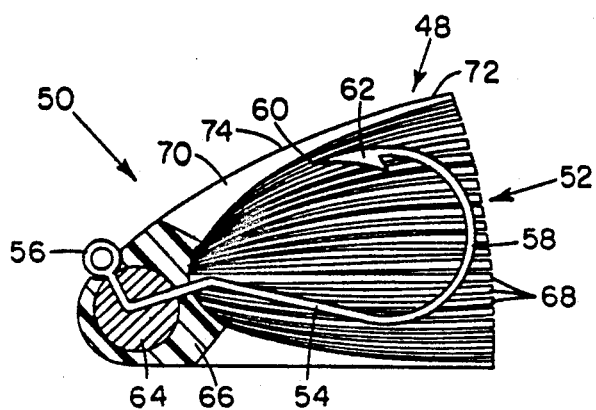
FIG. 9 illustrates yet another form of weedguard-skirt device according to the invention as applied to a pocket-type jig.
Figure 10:
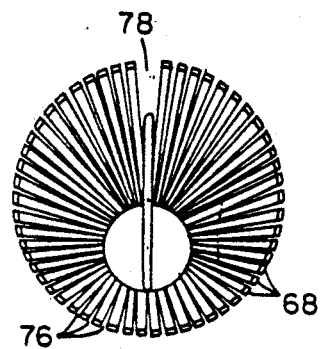
FIG. 10 is an end view of the weedguard-skirt device and jig shown in FIG. 9.

Referring to FIGS. 9 and 10, a weedguard-skirt device 48 according to the invention may readily be incorporated into a complete lure configuration, in this case, a weedless pocket-type jig 50. The lure includes a hook 52 having an angled shank portion 54, a hook eye 56, and a hook bend 58 with a hook point 60 and barb 62. The lure 50 also includes a weighted portion 64 positioned inside a pocket within the lure body 66 that forms the base for the weedguard-skirt device 48. Similar to the weedguard-skirt 10 shown in FIGS. 1–3, the weedguard-skirt device 48 shown in FIGS. 9 and 10 includes a plurality of individual weedguard-skirt members 68 each having a deflecting front portion 70, a rear or skirt portion 72, and a midsection 74. The individual weedguard-skirt members 68 are again separated by slits 76 with an optional wider slit 78 aligning with the hook point 60.

The embodiment shown in FIGS. 9 and 10 clearly shows that a weedguard-skirt device according to the invention need not have a totally symmetrical or parabolic shape as shown in FIGS. 1–3 and 8, but may be asymmetrical with respect to the longitudinal axis of the weedguard-skirt device. Furthermore, a weedguard-skirt device according to the invention need not extend around the entire circumference of the hook axis but may include one or more individual weedguard-skirt members positioned generally in front of or straddling each hook point. In this latter form of the invention, there will be no circumferential compacting of the front or deflecting portions as in the embodiments shown in FIGS. 1–3 and 8–10; however, the resistance to flexing in the direction of the hook shank of the enlarged front or deflecting portion of each weedguard-skirt member does provide the required debris deflecting capability. Also, the rear or skirt portion of each weedguard-skirt member will provide an undulating motion regardless of whether the weedguard-skirt members are positioned around the entire circumference of the lure or just ahead of each hook point.

The embodiment of the weedguard skirt in which only one or two weedguard skirt members are positioned on each side of or straddling each hook point is particularly useful for use with lures having a spoon to provide a wobbling action. To provide the desired wobbling action, the spoon must be used with a lure that otherwise provides little water resistance. A full weedguard-skirt as shown in FIGS. 1–3 and 8–10 tends to kill the action of the spoon by increasing water resistance. However, the weedguard-skirt embodiment having only one or two hook-straddling weedguard-skirt members does not significantly increase water resistance and allows the spoon to provide the desired action.

Referring again to FIG. 1, the method of the invention includes deflecting weeds or other debris away from a fishing hook point 22 with a weedguard-skirt member 28 lying in a plane extending radially outwardly from the shank 16 and extending approximately the same radial distance from the hook shank as the hook point. The method also includes producing an undulating motion rearwardly of the hook point 22 with a weedguard-skirt portion 40 of the weedguard-skirt member as the hook upon which the weedguard-skirt member is mounted is pulled through the water by the hook eye 18.

The above described preferred embodiments are intended to illustrate the principles of the invention, but not to limit the scope of the invention. Various other embodiments and modifications to these preferred embodiments may be made by those skilled in the art without departing from the scope of the following claims.

I claim:

1. A weedguard-skirt device for use with fishing hooks having an elongated hook shank, a hook eye, and at least one hook portion terminating in a hook point, the weedguard-skirt device being adapted for helping prevent each fishing hook point from snagging on debris as the fishing hook is pulled through water by the hook eye, and comprising:

(a) a plurality of elongated weedguard-skirt members, each weedguard-skirt member connected to the hook shank near the eye and extending substantially radially away from the hook shank and rearwardly in the direction from the hook eye toward the hook portion of the fishing hook, each weedguard-skirt member also lying generally in a different plane extending radially from the hook shank longitudinal axis;

(b) a front portion of each weedguard-skirt member extending radially from the hook shank a distance substantially equal to the radial distance of each hook point from the hook shank longitudinal axis, the front portion having a generally elongated rectangular transverse cross sectional shape oriented with the major transverse axis lying generally in the radially extending plane in which the respective weedguard-skirt member lies, such orientation and shape providing resistance to flexing in the direction inwardly toward the hook shank; and (c) a rear portion of each weedguard-skirt member extending generally rearwardly of the hook points, the rear portion of each weedguard-skirt member having a generally elongated transverse cross sectional shape oriented with the major transverse axis extending generally perpendicular to the radially extending plane in which the respective weedguard-skirt member lies, such shape and orientation enabling the rear portion to undulate as the hook is drawn through the water.

2. The weedguard-skirt device of claim 1 including a base portion connected to the hook shank near the hook eye, the weedguard-skirt members being connected to the base.

3. The weedguard-skirt device of claim 2 including gripping means formed in the base portion for gripping the hook shank so as to securely hold the base portion in a desired position on the hook shank.

4. The weedguard-skirt device of claim 3 wherein the base portion and the weedguard-skirt members are integrally formed from a suitable plastic material.

5. The weedguard-skirt device of claim 4 wherein the weedguard-skirt members are narrowly spaced apart around the circumference of the hook shank so that the front portions of the weedguard-skirt members compact together circumferentially as the weedguard-skirt and hook are pulled through the water, such compacting causing lateral contact between adjacent weedguard-skirt members and allowing the individual weedguard-skirt members to bend only radially with respect to the hook shank longitudinal axis.

6. The weedguard-skirt device of claim 1 wherein the transverse cross sectional shape of each weedguard-skirt member varies substantially continuously from the front portion to the rear portion and each weedguard-skirt member further includes a midsection portion that has a transverse cross section that is substantially square.

7. The weedguard-skirt device of claim 6 wherein the weedguard-skirt members extending radially around the circumference of the hook shank form generally a parabolic shape with the open end extending rearwardly of the fishing hook.

8. A weedguard-skirt member adapted for protecting a fishing hook from weeds or other debris as the hook is pulled through the water, the weedguard-skirt member comprising:

(a) an elongated weedguard-skirt front portion adapted to be positioned forward of the hook portion of the fishing hook so as to extend rearwardly toward said hook portion and substantially radially with respect to the hook shank a distance from the hook shank substantially equal to the radial distance of the hook point from the hook shank the weedguard-skirt front portion having a generally elongated rectangular transverse cross sectional shape oriented with the major transverse axis lying in a plane extending substantially radially from the hook shank longitudinal axis, such orientation and shape providing resistance to flexing in the direction inwardly toward the hook shank; and (b) an elongated weedguard skirt rear portion connected to the front portion of the weedguard-skirt member and extending rearwardly from the front portion adjacent to the fishing hook in substantially the same radial plane as the front portion, the rear portion having a generally elongated rectangular transverse cross sectional shape oriented with the major transverse axis extending generally perpendicular to the radial plane in which the front and rear portions, lie, such shape and orientation enabling the rear portion to undulate as the hook is drawn through the water.

9. The weedguard-skirt member of claim 8 wherein the transverse cross sectional shape varies substantially continuously from the front portion to the rear portion and further including a midsection portion between the front and rear portions that has a transverse cross section that is substantially square.

* * * * *